United States Patent [19]

McCrae et al.

[11] 4,077,953
[45] Mar. 7, 1978

[54] TRI-DENTATE METAL COMPLEX AZO PIGMENTS

[75] Inventors: James McGeachie McCrae, Stewarton; Christopher Midcalf, Kilbarchan, both of Scotland

[73] Assignee: Ciba-Geigy Corporation, Ardsley, N.Y.

[21] Appl. No.: 720,297

[22] Filed: Sep. 3, 1976

Related U.S. Application Data

[63] Continuation of ser. No. 507,644, Sep. 20, 1974, abandoned.

[51] Int. Cl.² ............ C09B 45/08; C09B 45/18; C09B 45/28; D06P 1/10
[52] U.S. Cl. ............ 260/149; 260/146 R; 260/147; 260/148; 260/150; 260/151
[58] Field of Search ............ 260/146 R, 148, 149, 260/150, 151, 147

[56] References Cited

U.S. PATENT DOCUMENTS

| 2,822,360 | 2/1958 | Ackermann ............ 260/151 |
| 2,824,094 | 2/1958 | Ackermann et al. ............ 260/146 R |
| 3,125,561 | 3/1964 | Beffa et al. ............ 260/146 R |

FOREIGN PATENT DOCUMENTS

| 1,101,659 | 3/1961 | Germany ............ 260/151 |

OTHER PUBLICATIONS

Venkataraman, "The Chemistry of Synthetic Dyes", vol. III, pp. 353–357 (1970).

*Primary Examiner*—Floyd D. Higel
*Attorney, Agent, or Firm*—Vincent J. Cavalieri

[57] ABSTRACT

A tri- or tetra-dentate metal complex having the formula

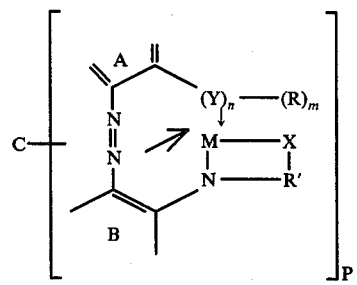

wherein A is an aryl or heterocyclic residue, B is an aliphatic, aryl or heterocyclic residue, R is an alkyl, cycloalkyl, aryl, aralkyl or heterocyclic residue or R is the atoms required to complete, together with A and Y, a heterocyclic residue, Y is O, S or N—R" wherein R" is the atoms required to complete, together with A and Y, a heterocyclic residue, X is O, S, $CO_2$ or N—R wherein R has its previous significance, and when X is $CO_2$, R' is a methylene residue and when X is O, S or N—R, R' is a carbon chain, which may form part of an aromatic or heterocyclic ring, and having 2 or 3 carbon atoms between the nitrogen atom and the X substituent, M is a Zn, Cu or Ni atom, n and m are the same or different and each is 0 or 1 and P is 1 or 2, and when p is 1, C is a hydrogen atom attached to one of the residues A, B, R or R' and when p is 2, C is either a direct bond linking two residues, A, B, R or R' or is an alkylene, arylene or aralkylene residue linking two residues A, B, R or R', which is useful for coloring organic material preferably a lacquer, paint or printing ink.

5 Claims, No Drawings

TRI-DENTATE METAL COMPLEX AZO PIGMENTS

This is a continuation of application Ser. No. 507,644, filed on Sept. 20, 1974, now abandoned.

The present invention relates to new pigments and, in particular, to new metal azo pigments and to processes for producing these pigments.

According to the present invention, there is provided a tri-or tetradentate metal complex having the formula:

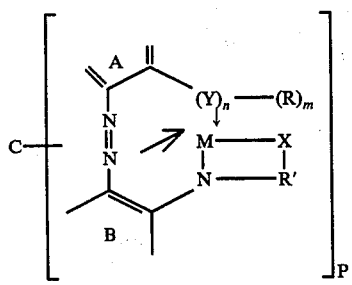

wherein A is an aryl or heterocyclic residue, B is an aliphatic, aryl or heterocyclic residue, R is an alkyl, cycloalkyl aryl, aralkyl or heterocyclic residue or R is the atoms required to complete, together with A and Y, a heterocyclic residue, Y is O, S or N—R″ wherein R″ is the atoms required to complete, together with A and Y, a heterocyclic residue, X is O, S, $CO_2$ or N—R wherein R has its previous significance, and when $X$ is $CO_2$, R′ is a methylene residue and when X is O, S or N—R, R′ is a carbon chain, which may form part of an aromatic or heterocyclic ring, and having 2 or 3 carbon atoms between the nitrogen atom and the X substituent, M is a Zn, Cu or Ni atom, $n$ and $m$ are the same or different and each is 0 or 1 and P is 1 or 2, and when $p$ is 1, C is a hydrogen atom attached to one of the residues A, B, R or R′ and when $p$ is 2, C is either a direct bond linking two residues A, B, R or R′ or C is an alkylene, arylene or aralky lene residue linking two residues A, B, R or R′.

A preferred group of metal complexes according to the invention have the formula:

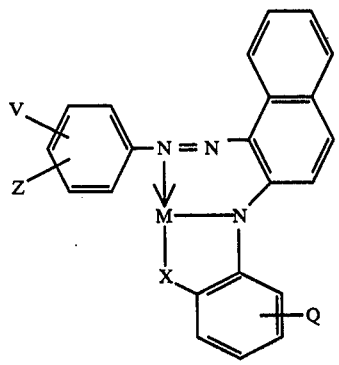

wherein V, Z and Q are the same or different and each is hydrogen, nitro or an alkyl or alkoxy residue having from 1 to 4 carbon atoms.

When A and/or B is an aryl residue the latter preferably contains from 6 to 14 carbon atoms and may consist of a single aromatic ring or two or more fused aromatic rings. The aryl residue may be unsubstituted or substituted with one or more groups which do not impart water-solubility to the complex compound of formula I, for instance alkyl, alkoxy, carboxyalkyl or alkyl carbamoyl groups, each having from 1 to 4 carbon atoms in the alkyl moiety, arylcarboxyarylamide, arylcarbamoyl groups, nitro groups or halogen atoms. Preferred examples of aryl residues A and/or B are phenyl and naphthyl residues.

When A and/or B is a heterocyclic residue, it may be either unsubstituted or substituted with one or more of the non-water-solubilising groups disclosed hereinbefore. A preferred heterocyclic residue A and/or B is the pyrazol-5-one residue.

When B is an aliphatic residue it may be the residue of any aliphatic coupling component which is capable of coupling with a diazonium salt, for instance, the aliphatic residue B may be a 1-methyl-2(anilinocarbonyl-)ethylene residue or a derivative thereof.

R is a monovalent group and may be an alkyl residue having from 1 to 20 carbon atoms, preferably from 1 to 12 carbon atoms such as a methyl, ethyl, propyl, butyl, hexyl, octyl, decyl or dodecyl residue; a cycloalkyl residue having 5 or 6 carbon atoms; an aryl residue having from 6 to 14 carbon atoms such as a phenyl or naphthyl residue; an aralkyl residue having from 7 to 12 carbon atoms, especially a benzyl residue; or a heterocyclic residue such as a pyrazol-5-one residue.

R′ is a divalent group and may be saturated or unsaturated. For instance, R′ may be a methylene, 1,2-ethylene, 1,2- or 1,3-propylene, allyl, methallyl, 1,2-, 1,3- or 1,4-phenylene or a 4,4′-biphenylene residue.

Preferably $p$ is 1 and C is a hydrogen atom attached to one of the residues A, B, R and R′. However when $p$ is 2, two molecules of the complex may be linked through the bridging group C via two residues A, B, R or R′. C may be a direct bond linking, for example, two p-phenylene or biphenylene residues A, B, R or R′, or may be an alkylene, arylene or aralkylene bridging group linking two residues A, B, R or R′.

Specific classes of compounds of formula I of particular interest are those having the formulae:

Class 1

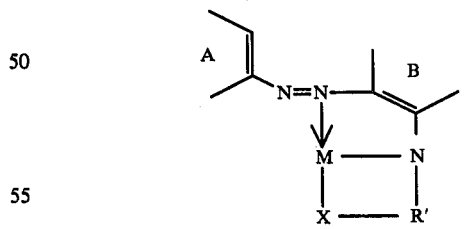

Class 2

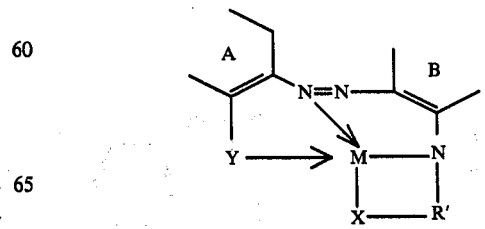

Class 3

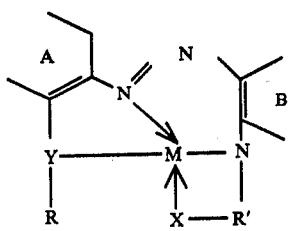
Examples of sub-groups within class 1 compounds are those having the formulae:
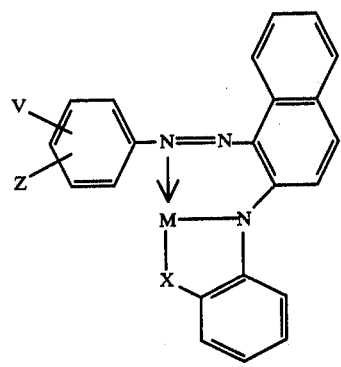
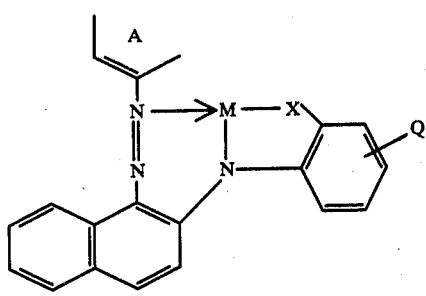
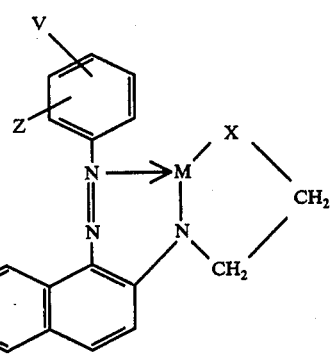
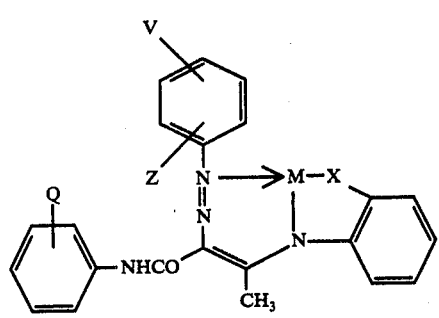
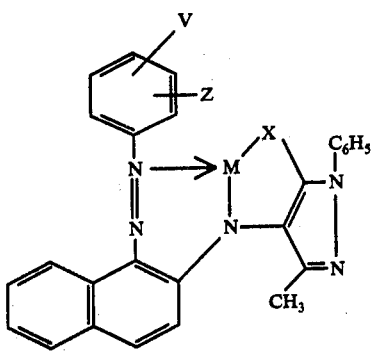
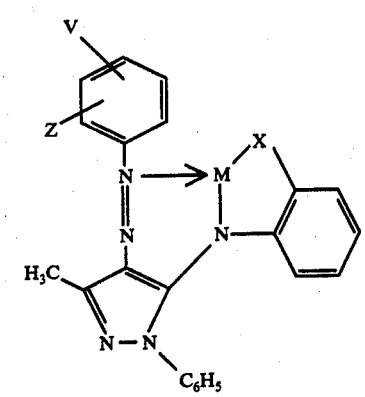
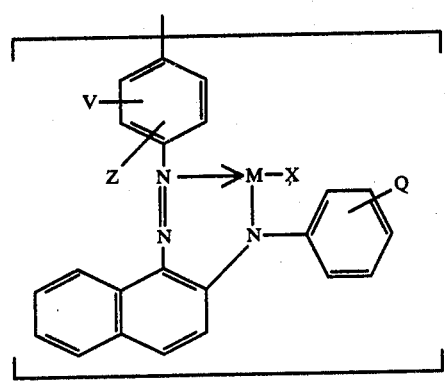
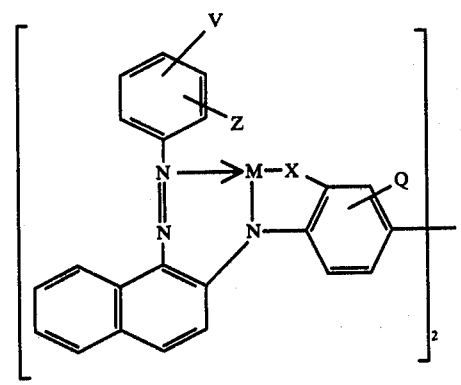
Examples of sub-groups within class 2 are compounds having the formulae:

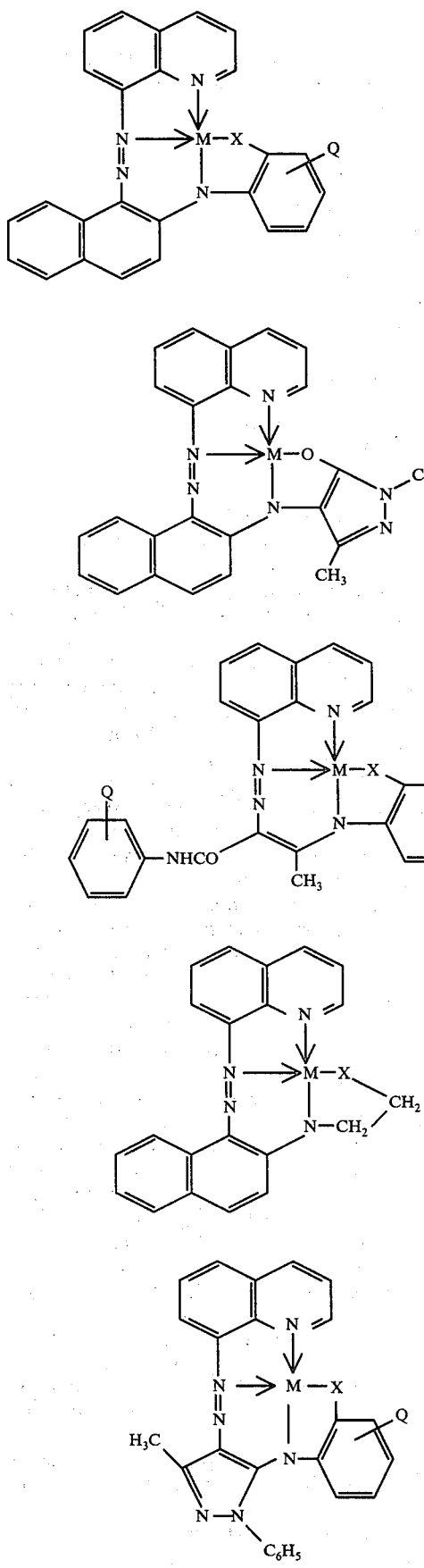

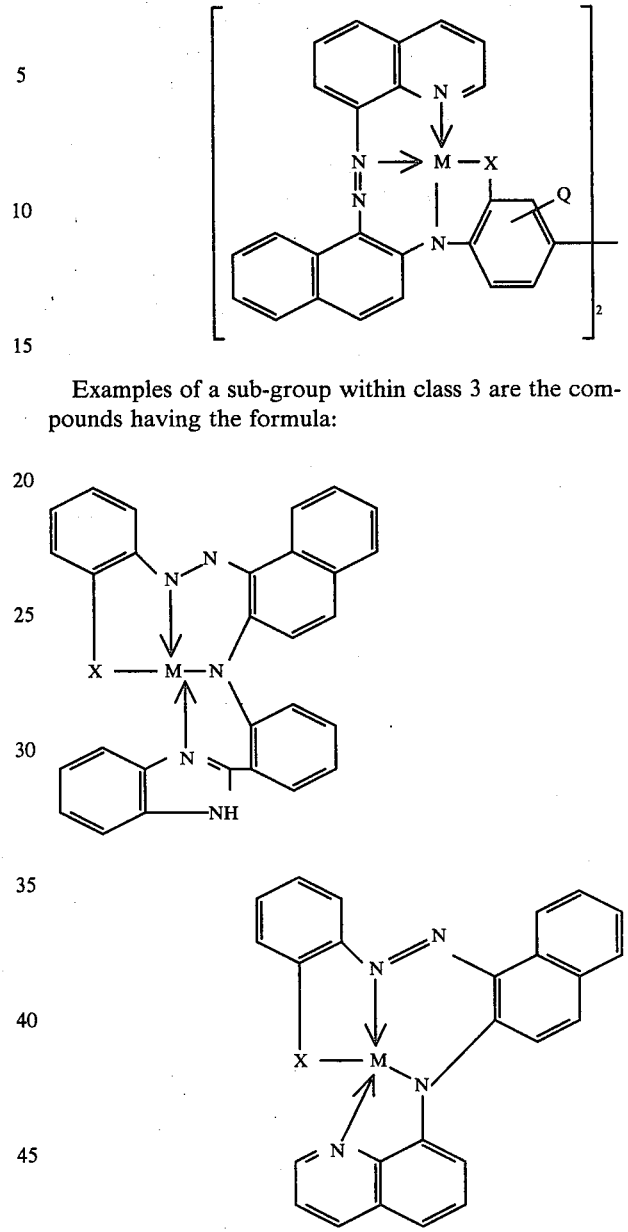

Examples of a sub-group within class 3 are the compounds having the formula:

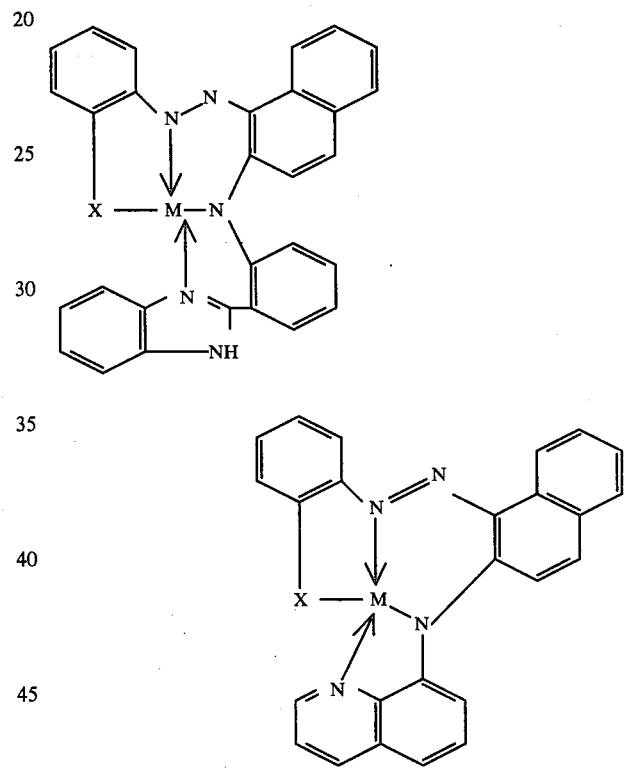

in each of foregoing formulae A, B, R, R', Y, X, M, V, Z, Q and *n* have their previous significance.

The present invention also provides a process of producing a compound of formula I comprising metallising a compound having the formula:

II

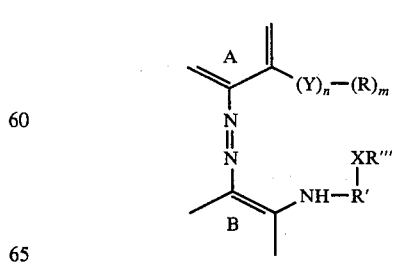

wherein A, B, R, R', X, Y, *m* and *n* have their previous significance and R''' is hydrogen or methyl.

The metallisation of the compound of formula II may be carried out directly in the reaction medium used to produce the compound of formula II. Alternatively, the compound of formula II may be separated from its crude reaction mixture, washed free from impurities and re-suspended, prior to metallisation, in a solvent which may be the same as or different from any solvent used to produce the compound of formula II.

The metallisation may be effected using a solution or suspension of any suitable salt or complex of the metal M. For instance, when the metallisation is a coppering process, a suspension of a copper salt in an organic solvent or an aqueous solution of a copper salt such as copper acetate, cuprammonium sulphate or sodium cuprotartrate may be used. In the case of metallisation with zinc, an aqueous or an organic solution of a zinc salt such as zinc sulphate may be used. When the metallisation is effected using nickel, it is convenient to use a solution of nickel acetate tetrahydrate in methyl cellosolve.

Many of the compounds of formula II are new compounds per se and may be prepared by methods known per se.

The present invention also provides a second process of producing a compound of formula I comprising reacting a coupling component having the formula:

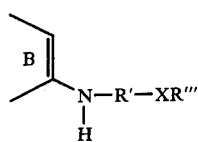

III wherein B, R', R''' and X have their previous significance, with a diazotised amine having the formula:

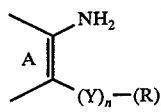

IV wherein A, R, Y, $m$ and $n$ have their previous significance and then metallising the product obtained. The coupling reaction is conveniently carried out under known coupling conditions.

The starting-materials for formulae III and IV are well known per se.

Coupling components of formula III suitable for use in the present invention include:

N-(2-hydroxyphenyl)-β-naphthylamine
N-(2-carboxyphenyl)-β-naphthylamine
N-(2-thiophenyl)-β-naphthylamine
N-(2-methylaminophenyl)-β-naphthylamine
N-(2-ethylaminophenyl)-β-naphthylamine
N-(2-carboxy-4-chlorophenyl)-β-naphthylamine
N-(2-carboxy-4-nitrophenyl)-β-naphthylamine
N-(1-phenyl-3-methyl-5-hydroxypyrazolyl)-β-naphthylamine
N-phenyl-3-(2'-hydroxyanilino)but-2-enoic acid amide
N-phenyl-3-(2'-thioanilino)but-2-enoic acid amide
N-phenyl-3-(2'-carboxyaniline)but-2-enoic acid amide
N-(2-hydroxyethyl)-β-naphthylamine
N-(2-thioethyl)-β-naphthylamine
N-(2-carboxyethyl)-β-naphthylamine
1-phenyl-3-methyl-5-(2'-hydroxyanilino)pyrazole
1-phenyl-3-methyl-5-(2'-carboxyanilino)pyrazole
N,N'-di-(β-naphthylamino)-2,2'-dihydroxy-4,4'diaminodiphenyl As examples of amines of formula IV suitable for use in the present invention there may be mentioned the following: aniline 2-, 3- or 4-chloroaniline
2-, 3- or 4-nitroaniline
2-, 3- or 4-methoxyaniline
2-, 3- or 4-aminopyridine
8-aminoquinoline
7-aminobenzofuran
2-hydroxyaniline
2-methoxyaniline
2-hydroxy-5-chloroaniline
2-hydroxy-4-nitroaniline
2-methoxy-4-nitroaniline
2-methoxy-4-nitro-5-methylaniline
2-methoxy-4-nitro-aniline
2-hydroxy-5-chloro-aniline Because of their insolubility in the reaction medium, the compounds of formula I can easily be isolated from the reaction mixture by filtration.

The compounds of formula I may be employed as pigments directly after production; that is after they have been filtered off from their crude reaction liquors and dried. Alternatively, they may be first processed using known wet or dry conditioning techniques such as grinding; either alone or in the presence of a water-soluble salt or other medium which can be subsequently removed, for instance by washing.

Accordingly, the present invention further provides a method of colouring organic material comprising incorporating into the organic material a minor proportion of a compound of formula I. The present invention also includes organic material so coloured.

The proportion of the compound of formula I employed to colour organic material according to the invention may be varied within a wide range, but is normally within the range of from 0.1% to 10%, preferably from 0,5% to 5% by weight bases on the total weight of organic material to be coloured.

Organic materials which may be coloured according to the invention include high molecular organic material, for example, cellulose ethers and cellulose esters such as ethyl cellulose, acetylcellulose and nitrocellulose, polyamides, polyurethanes and polyesters, natural and synthetic resins such as aminoplasts, especially urea-formaldehyde and melamine-formaldehyde resins, alkyd resins, phenoplasts, polycarbonates, polyolefines such as polystyrene, polyvinyl chloride, polyethylene, polypropylene, polyacrylonitrile, polyacrylic acid esters, rubber, casein, silicone and silicone resins, individually or in admixture. It does not matter whether these high molecular compounds are in the form of plastic masses or melts or in the form of spinning solutions. The compounds of formula I are of particular interest, however, for the colouration of lacquers, paints and printing inks.

Depending upon the end use, it may be advantageous to employ the compounds of formula I as a toner or in the form of a pigment preparation.

As a rule, the compounds of formula I are characterised by excellent fastness to light and solvents properties and high colour strength.

Some Examples will now be given, in which parts and percentages are by weight.

PREPARATION OF LIGANDS

EXAMPLE 1

27.9 Parts of aniline were stirred into a mixture of 77.5 parts of concentrated hydrochloric acid and 100 parts of cold water, the mixture cooled to 0°–5° C and maintained at this temperature during the addition of a solution of 20.7 parts of sodium nitrite in 40 parts of water. The resulting diazonium chloride solution was added over 15 minutes to a cold solution of 78.3 parts of 2-(2'-hydroxyphenylamino)naphthalene in 800 parts of ethanol. During the coupling 600 parts of water mixed with 60 parts of ethanol were added to prevent the suspension becoming too thick. The red suspension was stirred for 1 hour, filtered, the solid washed with ethanol/water mixture and dried at 55° C. Thus were obtained 91.5 parts of a redorange solid having a melting point of 135°–138° C, and having the structure:

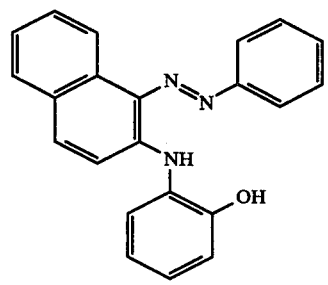

EXAMPLE 2

16.95 Parts of the product of Example 1 as paste before drying were mixed with high speed stirring into 400 parts of cold water containing 0.15 parts of Solumin FIOS. (the sodium salt of sulphonated alkyl phenoxy polyethoxyethanol). 20.4 Parts of sodium acetate trihydrate were added followed by 13.74 parts of copper sulphate pentahydrate dissolved in 50 parts of water. The temperature of the suspension was raised to 95° C by steam injection and held at 95° C with stirring for 3 hours. The resultant suspension was filtered hot, washed with hot water until free of sulphate and dried at 70° C. Thus were obtained 20.0 parts of a maroon solid of melting point not less than 300° C.

EXAMPLES 3 to 11

Using the procedure described above, the amines and the coupling components shown in the following Table I were reacted to produce the corresponding compound of formula II.

TABLE I

| Example | Amine | Coupling component | M.pt. [° C] | Yield [%] |
|---|---|---|---|---|
| 3 | 4-Cl-C₆H₄-NH₂ | 5,6,7,8-tetrahydronaphthalen-2-yl-NH-(2-hydroxyphenyl) | 165–6 | 90 |
| 4 | 4-NO₂-C₆H₄-NH₂ | 5,6,7,8-tetrahydronaphthalen-2-yl-NH-(2-hydroxyphenyl) | 170–5 | 89 |
| 5 | C₆H₅-NH₂ | naphthalen-2-yl-NH-(2-carboxyphenyl) | 135–7 | 97 |
| 6 | 4-Cl-C₆H₄-NH₂ | naphthalen-2-yl-NH-(2-carboxyphenyl) | 218–9 | 97 |
| 7 | 4-NO₂-C₆H₄-NH₂ | naphthalen-2-yl-NH-(2-carboxyphenyl) | 261–2 | 97 |

TABLE I-continued

| Example | Amine | Coupling component | M.pt. [° C] | Yield [%] |
|---|---|---|---|---|
| 8 | 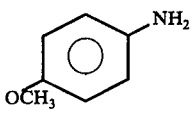 | 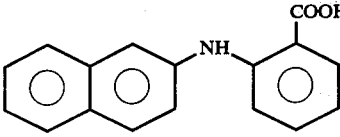 | 97–9 | 98 |
| 9 | 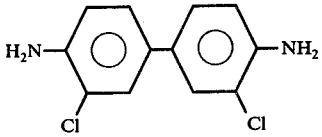 | 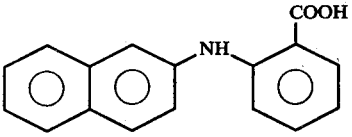 | >300 | 99 |
| 10 | 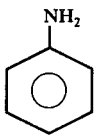 | 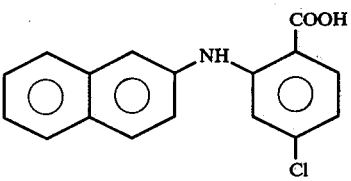 | 145–7 | 97 |
| 11 | 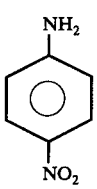 | 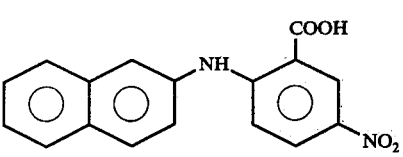 | 270 | 44 |

PREPARATION OF METAL COMPLEXES

EXAMPLE 12

67.8 Parts of the product of Example 1 were dissolved in 800 parts of hot methyl cellosolve and to this was added a solution of 40.0 parts of cupric acetate monohydrate dissolved in 400 parts of dimethyl formamide followed by 800 parts of methyl cellosolve. The resulting suspension was heated under reflux conditions for 4 hours, filtered hot and the solid washed with 400 parts of hot methyl cellosolve, followed by ethanol and then dried. In this way there were obtained 62.0 parts of a solid having melting point not less than 300° O and having the formula:

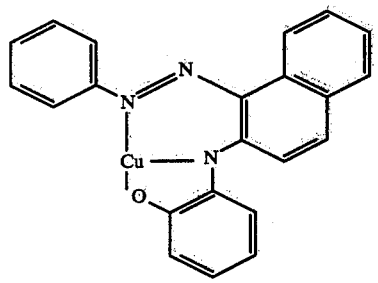

EXAMPLES 13 to 23

Using the procedure described above in Example 12, the ligands shown in the following Table II were copperised to give the products of the invention also identified in Table II.

TABLE II

| Ex. | Ligand | Product | Colour in lacquer |
|---|---|---|---|
| 13 | 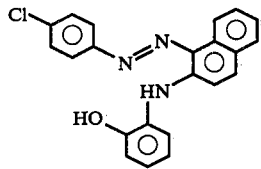 | 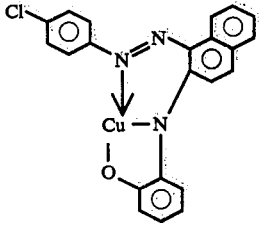 | Blue/red |

TABLE II-continued

| Ex. | Ligand | Product | Colour in lacquer |
|---|---|---|---|
| 14 | (4-nitrophenyl)azo-naphthyl-NH-(2-hydroxyphenyl) | Cu complex | Blue |
| 15 | phenylazo-naphthyl-NH-(2-carboxyphenyl) | Cu complex | Violet |
| 16 | (4-chlorophenyl)azo-naphthyl-NH-(2-carboxyphenyl) | Cu complex | Violet |
| 17 | (4-nitrophenyl)azo-naphthyl-NH-(2-carboxyphenyl) | Cu complex | Deep maroon |
| 18 | (4-methoxyphenyl)azo-naphthyl-NH-(2-carboxyphenyl) | Cu complex | violet blue |
| 19 | bis-azo biphenyl dichloro bis-naphthyl-NH-(2-carboxyphenyl) ligand | di-Cu complex | turqoise |

TABLE II-continued
| Ex. | Ligand | Product | Colour in lacquer |
|---|---|---|---|
| 20 | | | deep red (sl. blue) |
| 21 | | | bluish red |
| 22 | | | red |
| 23 | | | red |
What we claim is:
1. A metal complex of the formula:
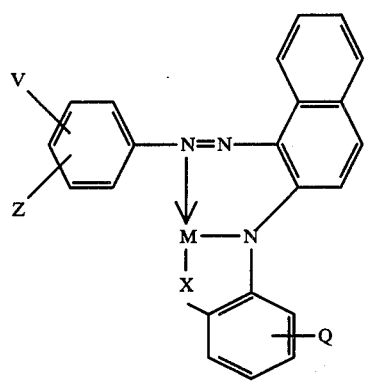
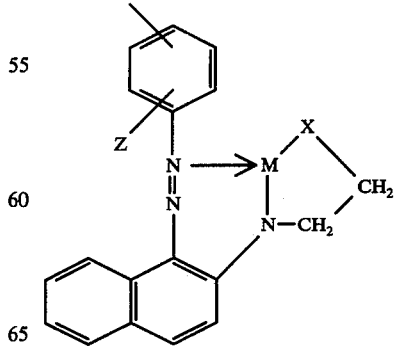
-continued -continued

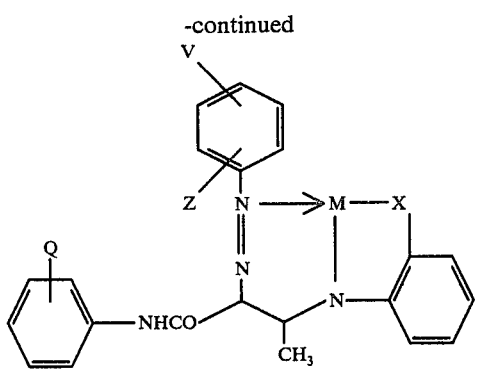

wherein V, Z and Q are the same or different and each is hydrogen, nitro, alkyl containing 1-4 carbon atoms, or alkoxy containing 1-4 carbon atoms, M is Zn, Cu or Ni, X is O, S, $CO_2$ or N—R where R is alkyl of 1-12 carbon atoms, cycloalkyl having 5 or 6 carbon atoms, aryl containing from 6-14 carbon atoms, or aralkyl containing from 7-12 carbon atoms.

2. A metal complex as claimed in claim 1 of the formula

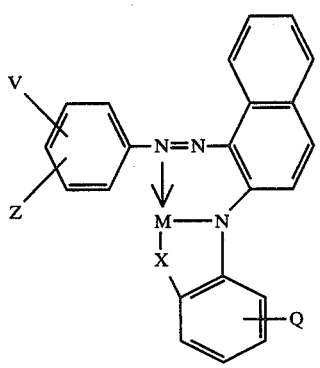

wherein V, Z and Q are the same or different and each is hydrogen, nitro, alkyl or alkoxy each having from 1 to 4 carbon atoms.

3. A metal complex as claimed in claim 2 of the formula

4. A metal complex as claimed in claim 1 of the formula

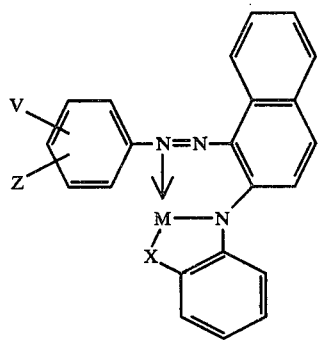

5. A metal complex as claimed in claim 1 of the formula

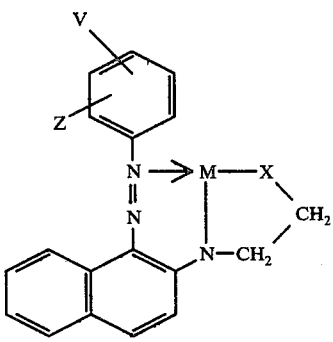

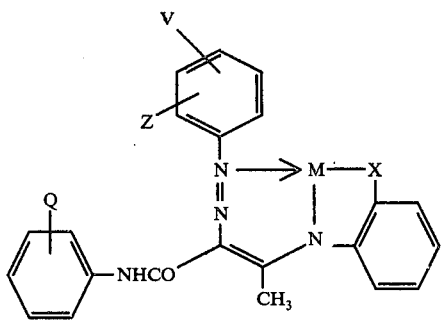

* * * * *